(12) United States Patent
Golovatai-Schmidt

(10) Patent No.: US 7,481,242 B2
(45) Date of Patent: Jan. 27, 2009

(54) SOLENOID-OPERATED DIRECTIONAL CONTROL VALVE

(75) Inventor: Eduard Golovatai-Schmidt, Röttenbach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 512 days.

(21) Appl. No.: 11/288,583

(22) Filed: Nov. 29, 2005

(65) Prior Publication Data

US 2006/0113402 A1    Jun. 1, 2006

(30) Foreign Application Priority Data

Nov. 30, 2004    (DE)    ........................ 10 2004 057 573

(51) Int. Cl.
*F15B 13/044*    (2006.01)
*H01F 3/10*    (2006.01)

(52) U.S. Cl. .................................. 137/625.65; 335/281

(58) Field of Classification Search ............ 137/625.65; 335/281

See application file for complete search history.

(56) References Cited

U.S. PATENT DOCUMENTS 4,267,897 A * 5/1981 Takeshima ................... 335/262
7,137,411 B2 * 11/2006 Golovatai-Schmidt et al. ... 137/625.65
2004/0035476 A1 * 2/2004 Holmes et al. ......... 137/625.65

FOREIGN PATENT DOCUMENTS

DE    196 40 897    2/1998
DE    199 51 043    5/2000

* cited by examiner

*Primary Examiner*—John Rivell
(74) *Attorney, Agent, or Firm*—Charles A. Muserlain

(57) ABSTRACT

Directional control valve, in particular a hydraulic 3/2-way directional control valve, having an actuating unit (1) and a valve unit (2), which is operatively connected to the actuating unit and in which a valve element (9), displaceable by the actuating unit (1) and having a tappet (14), controls ducts (4, 5, 6) of the valve unit (2) carrying hydraulic pressure medium, the actuating unit (1) having at least one coil (21), a magnetic core (18), which is arranged at least partially inside the coil (21), is of cylindrical design and has an end-face limit (22), and a moveable armature (15) interacting electromagnetically with the magnetic core (18) and comprising an end face (16), the armature being operatively connected to the tappet (14), the internal dimensions of the magnetic core (18) being larger than the external dimensions of the armature (15) and the magnetic core (18) and the armature (15) being arranged, formed and aligned in conjunction with the length of the tappet (14) so that the end face (16) of the armature (15) passes the end-face limit (22) of the magnetic core (18) along the displacement travel of the valve element (9).

7 Claims, 1 Drawing Sheet

SOLENOID-OPERATED DIRECTIONAL CONTROL VALVE

FIELD OF THE INVENTION

Directional control valve, in particular a hydraulic 3/2-way directional control valve, having an actuating unit and a valve unit, which is operatively connected to the actuating unit and in which a valve element, displaceable by the actuating unit and having a tappet, controls connections between ducts of the valve unit carrying hydraulic pressure medium, the actuating unit having at least one coil, a magnetic core, which is arranged at least partially inside the coil, is of cylindrical design and has an end-face limit, and a moveable armature interacting electromagnetically with the magnetic core and comprising an end face, the armature being operatively connected to the tappet.

BACKGROUND OF THE INVENTION

Such a directional control valve of the generic type is disclosed by DE 198 27 281 C1. In this directional control valve the magnetic core and the armature are arranged in series in the axial direction of the valve, the end-face limit and the end face being opposed to one another. If a current is then passed through the coil, an attractive force is produced between the magnetic core and the armature which increases in accordance with a hyperbolic function as the gap diminishes.

From this it follows that the force is greatest when the valve is being closed and the closing part lands on a fixed valve seat, so that unwanted noises and increased wear occur.

DE 197 54 257 A1 furthermore discloses a directional control valve, in which the end faces of the armature and the magnetic core are of conical design shape. A spring is furthermore fitted between these components. The valve seat of the valve element is displaceably supported on the tappet and is braced by a further spring. This design configuration makes it possible to reduce the landing force of the closing part of the valve element, thereby reducing the noises and the material load stress. This is achieved, however, by a tall, structured construction, conical design of the end faces and the use and coordination of two springs, which give rise to quite considerable costs.

OBJECT OF THE INVENTION

The object of the invention, therefore, is to design and modify the actuating unit of a directional control valve so that the attractive force between the magnetic core and the armature initially increases sharply, in order to produce a rapid acceleration of the closing part of the valve element, representing a high switching speed, and so that the attractive force diminishes again before the closing part of the valve element lands on the fixed valve seat, so that the noise and the wear and/or the material load stress are reduced. The components of the actuating unit are furthermore to be designed so as to allow production engineering that is consistent with mass production.

SUMMARY OF THE INVENTION

The object of the invention is achieved in that the internal dimensions of the magnetic core are larger than the external dimensions of the armature and that the magnetic core and the armature are arranged, formed and aligned in conjunction with the length of the tappet so that the end face of the armature passes the end-face limit of the magnetic core along the displacement travel of the valve element.

According to a preferred embodiment of the invention the magnetic core and the armature are so arranged, formed and aligned in conjunction with the length of the tappet that the end face of the armature passes the end-face limit of the magnetic core approximately halfway through the displacement travel of the valve element.

The magnitude of the axial force between the magnetic core and the armature varies as a function of the relative position of the end-face limit of the magnetic core and the end face of the armature. It is relatively small while ever the end face of the armature is still some distance away from the end-face limit of the magnetic core, then increases to its optimum when the end face and the end-face limit are approximately on the same level, and becomes smaller again or diminishes considerably as soon as the end face has passed the end-face limit and the armature sinks into the magnetic core. This embodiment of the invention produces a maximum attractive force between the magnetic core and the armature approximately in the middle of the displacement travel of the valve element, the force being used to accelerate the valve element. Before the valve element lands on the fixed valve seat, the attractive force is again small enough to permit a soft landing.

It should also be pointed out that the terms "internal dimensions" for the magnetic core and "external dimensions" for the armature have been deliberately used in the characterizing part of claim 1 in order to expressly indicate that this need not necessarily relate to circular cylindrical faces but may also relate to any other shapes having an angular, oval or other cross section.

In a further embodiment of the invention the air gap between the circular cylindrical inside diameter of the magnetic core and the circular cylindrical outside diameter of the armature is approximately 0.1 to 0.15 mm. This air gap is kept as small as possible, but it must be of a certain size in order to ensure an unimpeded movement between the magnetic core and the armature. The preferred embodiment of the magnetic core and of the armature, that is to say a circular cylindrical design form of the inside diameter and the outside diameter, is defined in claim 3.

Adjoining the magnetic core, in particular adjoining the end-face limit thereof, is a cylindrical body inside the coil, the body being composed of a non-magnetic and non-magnetizable material, and its internal dimensions basically corresponding to the internal dimensions of the magnetic core. This body may also run partially between the magnetic core and the coil and may also cover or completely enclose the coil on the side opposite the magnetic core. This body may also partially encompass the magnetic core and at the same time form the housing of the valve unit. It may be composed, for example, of a plastic material, a light metal or non-ferrous metal or the like.

Adjoining the end-face limit, on the outer edge facing the coil, the magnetic core furthermore has a radiusing, which runs out into the circumferential surface of the magnetic core. This serves to improve the magnetic flux between the coil and the magnetic core and to define the end-face limit more precisely in magnetic terms.

The magnetic core advantageously comprises a sheet-metal body, which has a circular cylindrical area and a disc-shaped area adjoining the former.

Such a magnet body made, from such a material can advantageously be manufactured by deep-drawing of a sheet metal, in which a cap-shaped component is first produced, in which the base is then punched out. The radiusing at the outer edge can then be produced simultaneously during the deep-drawing and/or punching.

BRIEF DESCRIPTION OF THE DRAWING

For further explanation of the invention, reference will be made to the drawing, which represents an exemplary embodiment of the invention in simplified form.

In the drawing.

DETAILED DESCRIPTION OF THE DRAWING

Figure 1:
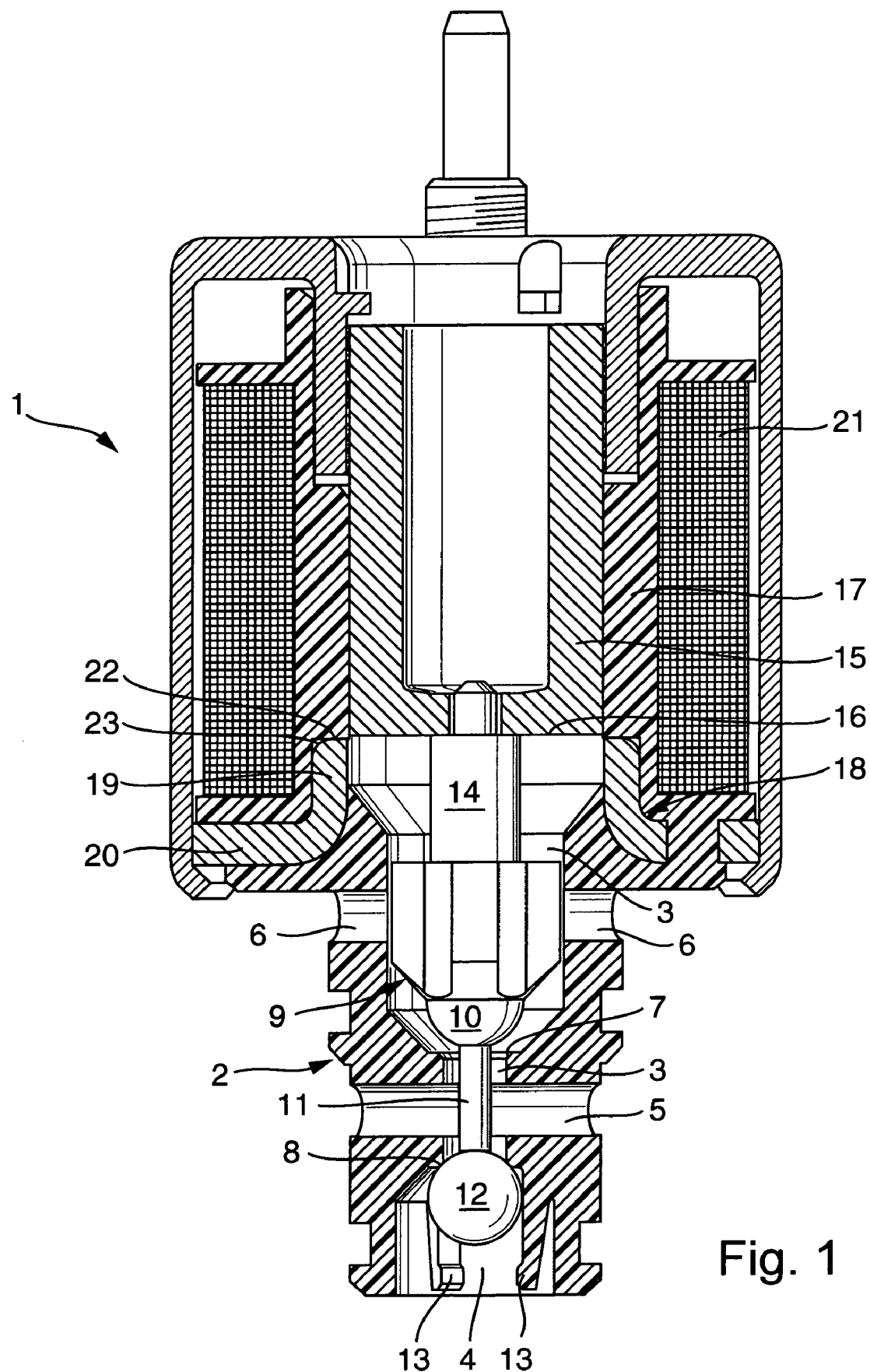
FIG. 1 shows a section through a hydraulic 3/2-way directional control valve.

In FIG. 1, 1 generally denotes the actuating unit of a directional control valve, and 2 the valve unit adjoining this. The valve unit 2 comprises a housing part, in which a multiple-stepped central recess denoted by 3 is sunk. Adjoining the recess 3 are ducts 4, 5, 6 carrying hydraulic pressure medium. The duct 4 is connected to a pressure generator (not shown), whilst, the duct 5 is connected to a consumer. The duct 6 is connected to a return connection (likewise not shown) and returns the hydraulic pressure medium to a reservoir.

Whilst the duct 4 on the housing end face opens into the directional control valve, the ducts 5 and 6 run transversely to the duct 4 in a radial direction.

In the end facing the actuating device the recess 3 has a larger radial extent, adjoining which in the first step is a valve seat denoted by 7. Adjoining the valve seat 7, the recess runs with reduced dimensions and opens into a valve counter-seat 8, which corresponds approximately to the valve seat 7 but is formed in the opposite direction. At the valve counter-seat 8 the recess 3 has a further widening, which opens into the pressure-carrying duct 4. Fitted inside the recess 3 is a valve element 9, which has a closing body 10 matching the valve seat 7. Adjoining the closing body 10 is a rod-shaped extension 11, which extends up to the valve counter-seat 8. A ball denoted by 12, which serves as closing body for the valve counter-seat 8, is provided to match the valve counter-seat 8. The ball 12 is freely moveable and can be lifted off from the valve counter-seat 8 by the rod-shaped extension 11. To guide the ball 12, hooks 13, which permit a limited movement of the ball for opening and closing of the valve counter-seat 8, but otherwise prevent the ball 12 from being removed, are formed on the housing of the valve unit 2. The duct 5 carrying hydraulic pressure medium crosses the rod-shaped extension 11, the duct 6 carrying hydraulic pressure medium crossing the valve element 9 above the closing body 10. If the actuating unit 1 is switched off, the fluid pressure in the duct 4 carrying hydraulic pressure medium can press the ball 12 against the valve counter-seat 8 and close the duct 4 carrying hydraulic pressure medium. At the same time the valve element 9 is raised via the rod-shaped extension 11, so that the closing body 10 lifts off from the valve seat 7. A flow connection is thereby established between the ducts 5 and 6 carrying hydraulic pressure medium.

If a current is now delivered to the actuating unit 1, the valve element 9 is displaced in the direction of the ball 12, the rod-shaped extension 11 lifting the ball off from the valve counter-seat 8. At the same time the closing body 10 comes into contact with the valve seat 7, so that a flow connection is made between the ducts 4 and 5 carrying hydraulic pressure medium, and the duct 6 carrying hydraulic pressure medium is separated from the other two ducts.

A tappet denoted by 14, which is operatively connected to an armature 15 designed with a canister-shaped hollow body, is formed onto the valve element 9. The armature 15 has an end face denoted by 16, which adjoins the tappet 14. The armature is of circular cylindrical design and has a circumferential surface, which is of circular cylindrical design. The armature 15 is arranged inside a cylindrical body 17 and a magnetic core 18 adjoining the former, and is fitted so that it is freely moveable. The magnetic core 18 has a circular cylindrical area 19 and a disc-shaped area 20, which are fixed to one another by way of an arched connection. An electrical coil denoted by 21, through which any current may be passed (not shown) is arranged around the cylindrical body 17, which also encloses the magnetic core 18. The magnetic core 18 has an end-face limit denoted by 22, which on its outer edge facing the coil has a radiusing denoted by 23.

In the non-energized basic position of the actuating unit 1, in which the valve body 10 is lifted off from the valve seat 7, the end face 16 is positioned above the end-face limit 22 of the magnetic core 18 at an interval which is approximately equal to the displacement travel of the valve element 9. Approximately halfway through the displacement travel of the valve element 9, the end face 16 and the end-face limit 22 are situated on the same level, whilst in the energized closed position of the valve element 9 when the closing body 10 closes the valve seat 7 and the rod-shaped extension 11 has lifted the ball 12 off from the valve counter-seat 8, the end face 16 has sunk into the magnetic core and is positioned below the end-face limit 22 of the magnetic core.

It should also be pointed out that the design of the armature and the magnetic core according to the invention mean that the closing force increases all the more, the further the armature sinks into the magnetic core and the end face 16 has exceeded the end-face limit 22. From this it follows that the closing force diminishes as a function of the wear between the closing body 10 and the valve seat 7 and a self-regulating effect occurs, so that the landing of the closing body 10 on the valve seat 7 becomes slower, the greater the wear.

LIST OF REFERENCE NUMERALS 1 actuating unit
2 valve unit
3 recess
4 duct carrying hydraulic pressure medium
5 duct carrying hydraulic pressure medium
6 duct carrying hydraulic pressure medium
7 valve seat
8 valve counter-seat
9 valve element
10 closing body
11 rod-shaped extension
12 ball
13 hook
14 tappet
15 armature
16 end face
17 cylindrical body
18 magnetic core
19 circular cylindrical area
20 disc-shaped area
21 coil
22 end-face limit
23 radiusing

The invention claimed is:

1. A directional control valve, in particular a hydraulic 3/2-way directional control valve, having an actuating unit (1) and a valve unit (2), which is operatively connected to the actuating unit and in which a valve element (9), displaceable by the actuating unit (1) and having a tappet (14), controls connections between ducts (4, 5, 6) of the valve unit (2) carrying hydraulic pressure medium, the actuating unit (1) having at least one coil (21), a magnetic core (18), which is arranged at least partially inside the coil (21), is of cylindrical design and has an end-face limit (22), and a moveable armature (15) interacting electromagnetically with the magnetic core (18) and comprising an end face (16), the armature being operatively connected to the tappet (14), characterized in that the internal dimensions of the magnetic core (18) are larger than the external dimensions of the armature (15) and that the magnetic core (18) and the armature (15) are arranged, formed and aligned in conjunction with the length of the tappet (14) so that the end face (16) of the armature (15) passes the end-face limit (22) of the magnetic core (18) along the displacement travel of the valve element (9), wherein inside the coil (21) adjoining the magnetic core (18), in particular adjoining the end-face limit (22) thereof, a cylindrical body (17) composed of a non-magnetizable material is provided, the internal dimensions of which basically correspond to the internal dimensions of the magnetic core (18), wherein the cylindrical body (17) partially encompasses the magnetic core (18) and forms the housing of the valve unit (2).

2. The directional control valve of claim 1, characterized in that the end face (16) of the armature (15) passes the end-face limit (22) of the magnetic core (18) approximately halfway through the displacement travel of the valve element (9).

3. The directional control valve of claim 1 wherein the air gap between the circular cylindrical inside diameter of the magnetic core (18) and the circular cylindrical outside diameter of the armature (15) is approximately 0.1 to 0.15 mm.

4. The directional control valve of claims 1, wherein adjoining the end-face limit (22), on its outer edge facing the coil (21), the magnetic core (18) has a radiusing (23), which runs out into the circumferential surface of the magnetic core (18).

5. The directional control valve of claim 1, wherein the magnetic core (18) has a circular cylindrical area (19) and a disc-shaped area (20) adjoining the former.

6. The directional control valve of claim 4, wherein the magnetic core (18) is manufactured as a cap-shaped deep-drawn part, in which the base is then punched out.

7. The directional control valve of claim 6, wherein the radiusing (23) is produced during the deep-drawing and/or punching operations.

\* \* \* \* \*